United States Patent Office.

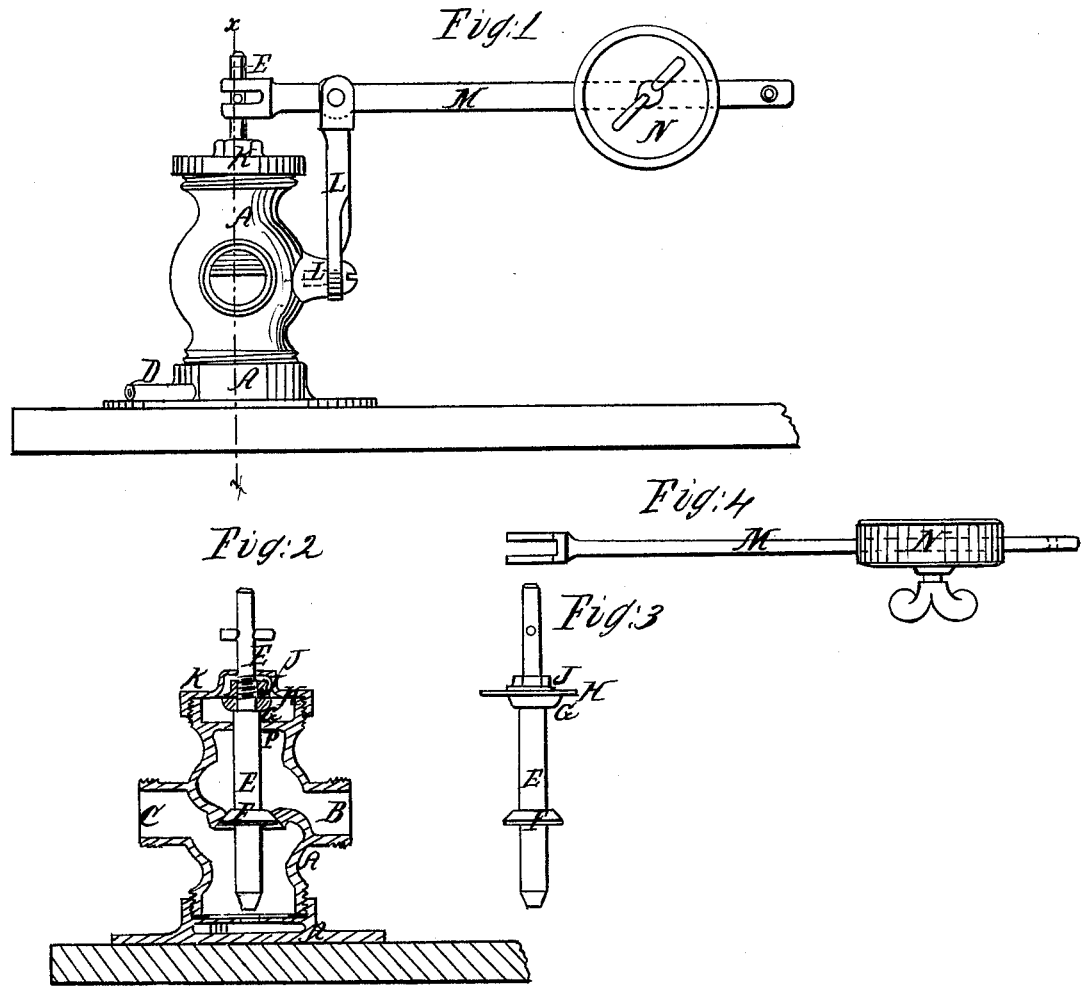

PETER REGITZ, OF CHICAGO, ILLINOIS.

*Letters Patent No. 91,483, dated June 15, 1869.*

IMPROVEMENT IN HOPPER-COCKS.

The Schedule referred to in these Letters Patent and making part of the same.

*To whom it may concern:*

Be it known that I, PETER REGITZ, of Chicago, in the county of Cook, and State of Illinois, have invented a new and useful Improvement in Hopper-Cocks; and I do declare that the following is a true and accurate description thereof, reference being had to the accompanying drawings, and to the letters of reference marked thereon, and being a part of this specification.

Figure 1 is an elevation.

Figure 2 is a sectional elevation on the line $x\,x$, fig. 1.

Figure 3 is a detached view of valve and stem.

Figure 4 is a detached view of the lever.

Like letters indicate like parts in each figure.

The nature of this invention relates to an improvement in hopper-cocks, and consists in the peculiar arrangement and construction of the valve and stem, to be operated by lever and weight, instead of springs.

A, in the drawings, represents the proper shell of a hopper-cock.

B is the inlet,

C, the outlet, and

D, the waste-pipe.

E represents the valve-rod or stem, upon which is securely attached the "ground valve" F, instead of the leather valve commonly used.

G is a washer, resting on proper offset on the valve-stem E, and is designed, when the stem is depressed, to seat itself on the opening P, and keep the same water-tight.

H is a rubber washer, extending to the outside edge of shell A, and is held in position by nut J.

K is a head, screwed upon the case, as shown, and provided with an opening, to admit the valve-stem E.

The shell A is provided with projection and standard L, its upper end having a slot, to receive the lever M, the short arm of which is also provided with slot, to receive the valve-stem E, the whole being connected and held in place by proper bolts or pins.

Movable weight N, on lever M, is secured, in any desired position, by a thumb-screw.

It is a well-known fact that much trouble and expense are experienced by the use of the common "hopper-cock" in water-closets, as they are continually getting out of repair, allowing the water to overflow, and often doing serious damage. This invention is intended to do away with all these annoyances, and its operation may be explained as follows, admitting, however, the supposition that it is in proper place, and ready for use:

By sitting upon the seat, the valve-stem E is depressed, which opens the valve F, and allows a free passage of water through the vault. At the same time, the short arm of the lever is depressed, and the washer G is forced down in place, to prevent the water from overflowing. Arising from the seat, the action of the weight on the long arm of the lever, effectually closes the valve, and shuts off the water.

What I claim as my invention, and desire to secure by Letters Patent, is—

The combination of the shell A, ground valve F, stem E, washers G and H, nut J, lever M, weight N, and standard and projection, L, when arranged and operating substantially as and for the purposes herein set forth and shown.

PETER REGITZ.

Witnesses:
T. J. SULLIVAN,
GEO. O. MANCHESTER.